US012666481B2

(12) United States Patent
Selvaganapathy et al.

(10) Patent No.: US 12,666,481 B2
(45) Date of Patent: Jun. 23, 2026

(54) CONTROLLING EXECUTION OF CONDITIONAL MOBILITY PROCEDURES IN WIRELESS COMMUNICATION

(71) Applicant: Nokia Technologies Oy, Espoo (FI)

(72) Inventors: Srinivasan Selvaganapathy, Bangalore (IN); Ahmad Awada, Munich (DE); Amaanat Ali, Espoo (FI); Faranaz Sabouri-Sichani, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 577 days.

(21) Appl. No.: 18/044,050

(22) PCT Filed: Jul. 19, 2021

(86) PCT No.: PCT/EP2021/070116
§ 371 (c)(1),
(2) Date: Mar. 3, 2023

(87) PCT Pub. No.: WO2022/058069
PCT Pub. Date: Mar. 24, 2022

(65) Prior Publication Data
US 2023/0379771 A1 Nov. 23, 2023

(30) Foreign Application Priority Data

Sep. 18, 2020 (EP) .................................... 20196944

(51) Int. Cl.
*H04W 4/00* (2018.01)
*H04W 36/00* (2009.01)
(Continued)

(52) U.S. Cl.
CPC ..... *H04W 76/15* (2018.02); *H04W 36/00698* (2023.05); *H04W 36/362* (2023.05)

(58) Field of Classification Search
CPC ............. H04W 36/00; H04W 36/0069; H04W 36/062
See application file for complete search history.

(56) References Cited

U.S. PATENT DOCUMENTS

2011/0286399 A1   11/2011   Chapman et al.
2020/0154326 A1   5/2020   Deenoo et al.
(Continued)

FOREIGN PATENT DOCUMENTS

EP   3689028 A1   8/2020
WO   2016/108560 A1   7/2016
(Continued)

OTHER PUBLICATIONS

"Discussion on conditional PSCell addition/change", 3GPP TSG-RAN WG2 Meeting #111 electronic, R2-2006901, Agenda: 8.2.3, ZTE Corporation, Aug. 17-28, 2020, 12 pages.
(Continued)

*Primary Examiner* — Elisabeth Benoit Magloire
(74) *Attorney, Agent, or Firm* — Barta Jones, PLLC

(57) ABSTRACT

An apparatus comprising means for controlling execution of a plurality of conditional mobility procedures, the conditional mobility procedures comprising a first conditional mobility procedure comprising a first configuration initiated by a first network node, and a second conditional mobility procedure comprising a second configuration initiated by a second network node, wherein controlling execution of the plurality of conditional mobility procedures comprises controlling sequential execution of the first and second conditional mobility procedures based on the first configuration and the second configuration.

8 Claims, 7 Drawing Sheets

(51) Int. Cl.
H04W 36/36 (2009.01)
H04W 76/15 (2018.01)

(56) References Cited

U.S. PATENT DOCUMENTS

| | | | | |
|---|---|---|---|---|
| 2021/0051534 | A1* | 2/2021 | Xu ........................ | H04W 36/38 |
| 2021/0058829 | A1* | 2/2021 | Ozturk .............. | H04W 36/0064 |
| 2022/0022121 | A1* | 1/2022 | Eklöf .............. | H04W 36/00837 |
| 2022/0322174 | A1* | 10/2022 | Da Silva .............. | H04W 76/19 |
| 2023/0308960 | A1* | 9/2023 | Selvaganapathy .......................... | |
| | | | | H04W 36/0058 |
| 2024/0406833 | A1* | 12/2024 | Sabouri-Sichani ... | H04W 76/19 |

FOREIGN PATENT DOCUMENTS

| | | | |
|---|---|---|---|
| WO | 2019/061189 | A1 | 4/2019 |
| WO | 2019/240770 | A1 | 12/2019 |
| WO | 2020/128848 | A1 | 6/2020 |
| WO | 2020/132427 | A1 | 6/2020 |
| WO | 2020/135400 | A1 | 7/2020 |

OTHER PUBLICATIONS

"Avoiding simultaneous CHO and CPC", 3GPP TSG-RAN WG3 Meeting #107-bis-e, R3-201656, Agenda: 15.3.1.1, Nokia, Apr. 20-30, 2020, 4 pages.
"Report on Email Discussion [107b#52][NR MobE] Open Issues Conditional PSCell Addition/Change (CATT)", 3GPP TSG-RAN WG2 Meeting #108, R2-1916300, Agenda: 6.9.4, CATT, Nov. 18-22, 2019, 46 pages.
"On avoiding simultaneous CHO and CPC", 3GPP TSG-RAN WG2 Meeting #109e, R2-2001007, Agenda: 6.9.4.1, Nokia, Feb. 24-Mar. 6, 2020, 2 pages.
"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.1.0, Mar. 2020, pp. 1-74.
"Msc-generator", Sourceforge, Retrieved on Mar. 30, 2023, Webpage available at : https://sourceforge.net/projects/msc-generator/.
"Introduction of Conditional NR-PSCell Change for intra-SN without MN involvement", 3GPP TSG-RAN2 Meeting #109e, R2-2001758, CATT, Feb. 24-Mar. 6, 2020, pp. 1-6.

"Applicability of CHO agreements to conditional PSCell change", 3GPP TSG-RAN WG2 #107bis, R2-1912983, Agenda: 6.9.4, NEC, Oct. 14-18, 2019, 11 pages.
Extended European Search Report received for corresponding European Patent Application No. 20196944.1, dated Mar. 5, 2021, 14 pages.
"Inter Master Node handover with Secondary Node change", 3GPP TSG-RAN2#99, R2-1709403, Agenda: 10.2.4, NTT Docomo Inc, Aug. 21-25, 2017, pp. 1-5.
"Inter-node exchange of UAI for SCG during handover", 3GPP TSG-RAN WG2 Meeting #111 electronic, R2-2006988, Agenda: 6.9.3, CATT, Aug. 17-28, 2020, 33 pages.
"Conditional PSCell addition/change", 3GPP RAN WG2 Meeting #108, R2-1914877, Agenda: 6.9.4, InterDigital Inc, Nov. 18-22, 2019, 4 pages.
"Coexistence of CHO and CPC at the UE", 3GPP RAN WG2 Meeting #111-e, R2-2006757, Agenda: 8.2.3, InterDigital Inc, Aug. 17-28, 2020, 2 pages.
"Remaining issue for conditional PSCell change", 3GPP TSG-RAN WG2 #110, R2-200xxxx, Agenda: 6.9.4, Ericsson, Jun. 1-12, 2020, 4 pages.
International Search Report and Written Opinion received for corresponding Patent Cooperation Treaty Application No. PCT/EP2021/070116, dated Aug. 20, 2021, 14 pages.
Office Action received for corresponding Indian Patent Application No. 202347026862, dated Feb. 1, 2024, 7 pages.
Office Action received for corresponding Japanese Patent Application No. 2023-518283, dated Feb. 29, 2024, 3 pages of Office Action and 6 pages of summary and translation available.
"Discussion on CHO for DC scenarios", 3GPP TSG-RAN WG2 Meeting #109 electronic, R2-2001553, Agenda item: 6.9.3.3, CMCC, Feb. 24-Mar. 6, 2020, 6 pages.
"Avoiding Simultaneous CHO and CPC", 3GPP TSG-RAN WG3 Meeting #108-e, R3-203330, Agenda item: 15.3.1.1, Qualcomm Incorporated, Jun. 1-12, 2020, 3 pages.
"Consecutive Conditional Handover", 3GPP TSG-RAN WG2 Meeting #108, R2-1914513, Agenda Item: 6.9.3.1, Apple Inc., Nov. 18-22, 2019, 8 pages.
"Conditional reconfigurations", 3GPP TSG-RAN WG2 #111, R2-2007599, Agenda Item: 8.2.3 Conditional PSCell change / addition, Ericsson, Aug. 17-28, 2020, pp. 1-10.
Office Action received for corresponding European Patent Application No. 20196944.1, dated Jun. 25, 2024, 7 pages.

\* cited by examiner

1600

CONTROLLING EXECUTION OF CONDITIONAL MOBILITY PROCEDURES IN WIRELESS COMMUNICATION

RELATED APPLICATION

This application was originally filed as PCT Application No. PCT/EP2021/070116, filed on Jul. 19, 2021, which claims priority from EP application Ser. No. 20/196,944.1, filed on Sep. 18, 2020, each of which is incorporated herein by reference in its entirety.

TECHNOLOGICAL FIELD

Examples of the present disclosure relate to controlling execution of conditional mobility procedures in wireless communication. Some relate to controlling execution of conditional mobility procedures during Evolved Universal Terrestrial Radio Access (E-UTRA)—$5^{th}$ Generation (5G) New Radio (NR) multi-connectivity.

BACKGROUND

Multi-Radio Dual Connectivity (MR-DC) is an example of multi-connectivity. MR-DC enables a user equipment (UE) with multiple receivers/transmitters to utilise resources provided by different nodes. During multi-connectivity, the UE stores a configuration.

An established multi-connectivity connection can be reconfigured by transmitting a reconfiguration message. In 3GPP systems, the reconfiguration message is referred to as a RRC reconfiguration message.

In some circumstances it may be desirable to provide improved handling of reconfiguration messages in multi-connectivity.

BRIEF SUMMARY

According to various, but not necessarily all, embodiments there is provided an apparatus comprising means for controlling execution of a plurality of conditional mobility procedures, the conditional mobility procedures comprising a first conditional mobility procedure comprising a first configuration initiated by a first network node, and a second conditional mobility procedure comprising a second configuration initiated by a second network node, wherein controlling execution of the plurality of conditional mobility procedures comprises controlling sequential execution of the first and second conditional mobility procedures based on the first configuration and the second configuration.

In some but not necessarily all examples, control of the sequential execution is based on dependency of the second configuration on a source configuration, and wherein the first configuration is capable of changing the source configuration.

In some but not necessarily all examples, the apparatus comprises means for enabling sequential execution of the first and second conditional mobility procedures in dependence on the second configuration being a full configuration.

In some but not necessarily all examples, the apparatus comprises means for enabling sequential execution of the first and second conditional mobility procedures with release of the second configuration in dependence on the second configuration being a delta configuration with respect to the source configuration.

In some but not necessarily all examples, the apparatus comprises means for enabling sequential execution of the first and second conditional mobility procedures with release of the second configuration in dependence on whether release of the second configuration is acceptable, wherein whether release of the second configuration is acceptable is dependent on a bearer mapping of the second configuration.

In some but not necessarily all examples, the apparatus comprises means for enabling sequential execution of the first configuration and the second configuration in dependence on the second configuration containing a same configuration as the source configuration.

In some but not necessarily all examples, the apparatus comprises means for enabling sequential execution of the first configuration and the second configuration in dependence on the second configuration containing the same configuration as the source configuration and satisfying a user equipment capability split condition.

In some but not necessarily all examples, the second conditional mobility procedure comprises a plurality of target configurations associated with different target nodes, and not all of the target nodes allow sequential execution of the first and second conditional mobility procedures, and wherein the apparatus comprises means for enabling sequential execution of the first and second conditional mobility procedures when allowed by a set 'N' of one or more of the target nodes that are most likely to satisfy a trigger condition of the second conditional mobility procedure.

In some but not necessarily all examples, the second conditional mobility procedure is a conditional master node handover procedure prompted by a reconfiguration message initiated by the second network node, wherein the second network node is a source master node, wherein the reconfiguration message from the second network node comprises:

a set of one or more target configurations associated with different target master nodes;

a set of one or more handover triggering conditions; and the second configuration comprising a target secondary cell group configuration, wherein the first conditional mobility procedure is a conditional primary secondary cell change procedure prompted by a reconfiguration message initiated by the first network node, wherein the first network node is a secondary node, and wherein the reconfiguration message from the first network node comprises a set of one or more primary secondary cell configurations including the first configuration.

According to various, but not necessarily all, embodiments there is provided an apparatus comprising means for controlling execution of a plurality of conditional mobility procedures, the conditional mobility procedures comprising a first conditional mobility procedure comprising a first configuration initiated by a first network node, and a second conditional mobility procedure comprising a second configuration initiated by a second network node, wherein controlling execution of the plurality of conditional mobility procedures comprises sending towards a user equipment information for controlling sequential execution of the first and second conditional mobility procedures based on the first configuration and the second configuration.

In some but not necessarily all examples, the apparatus is configured to operate as the second network node, the apparatus comprising means for:

sending to a target network node a request associated with the second conditional mobility procedure;

receiving a response from the target network node comprising the second configuration; and based on the response, sending to the user equipment the second configuration and the information for controlling sequential execution of the first and second conditional mobility procedures.

In some but not necessarily all examples, the apparatus is configured to operate as a target network node associated with the second conditional mobility procedure, the apparatus comprising means for:

receiving a request associated with the second conditional mobility procedure; and sending to the second network node the second configuration and the information for controlling sequential execution of the first and second conditional mobility procedures.

According to various, but not necessarily all, embodiments there is provided an apparatus comprising means for controlling execution of a plurality of conditional mobility procedures, the conditional mobility procedures comprising a first conditional mobility procedure comprising a first configuration initiated by a first network node, and a second conditional mobility procedure comprising a second configuration initiated by a second network node, wherein controlling execution of the plurality of conditional mobility procedures comprises receiving a message for controlling sequential execution of the first and second conditional mobility procedures based on the first configuration and the second configuration.

According to various, but not necessarily all, embodiments there is provided a method comprising:

controlling execution of a plurality of conditional mobility procedures, the conditional mobility procedures comprising a first conditional mobility procedure comprising a first configuration initiated by a first network node, and a second conditional mobility procedure comprising a second configuration initiated by a second network node, wherein controlling execution of the plurality of conditional mobility procedures comprises controlling sequential execution of the first and second conditional mobility procedures based on the first configuration and the second configuration.

According to various, but not necessarily all, embodiments there is provided a computer program that when run by a computer causes:

controlling execution of a plurality of conditional mobility procedures, the conditional mobility procedures comprising a first conditional mobility procedure comprising a first configuration initiated by a first network node, and a second conditional mobility procedure comprising a second configuration initiated by a second network node, wherein controlling execution of the plurality of conditional mobility procedures comprises controlling sequential execution of the first and second conditional mobility procedures based on the first configuration and the second configuration.

According to various, but not necessarily all, embodiments there is provided examples as claimed in the appended claims.

BRIEF DESCRIPTION

Some examples will now be described with reference to the accompanying drawings in which:

4

DEFINITIONS

3GPP 3$^{rd}$ Generation Partnership Project
5G 5$^{th}$ Generation Standard for Cellular Networks
CHO Conditional Handover
CPC Conditional PSCell Change
E-UTRA Evolved Universal Terrestrial Radio Access
eNB eNodeB
gNB gNodeB
gNB-CU gNodeB centralized unit
gNB-DU gNodeB distributed unit
MCG Master Cell Group
MN Master Node
NR New Radio
PCell Primary Cell
PSCell Primary Secondary Cell
RAN Radio Access Network
RAT Radio Access Technology
RLC Radio Link Control
RLF Radio Link Failure
RRC Radio Resource Control
SCell Secondary Cell
SCG Secondary Cell Group
SgNB Secondary gNodeB
SN Secondary Node
SRB3 Signal Radio Bearer 3
UE User Equipment

DETAILED DESCRIPTION

Figure 1:
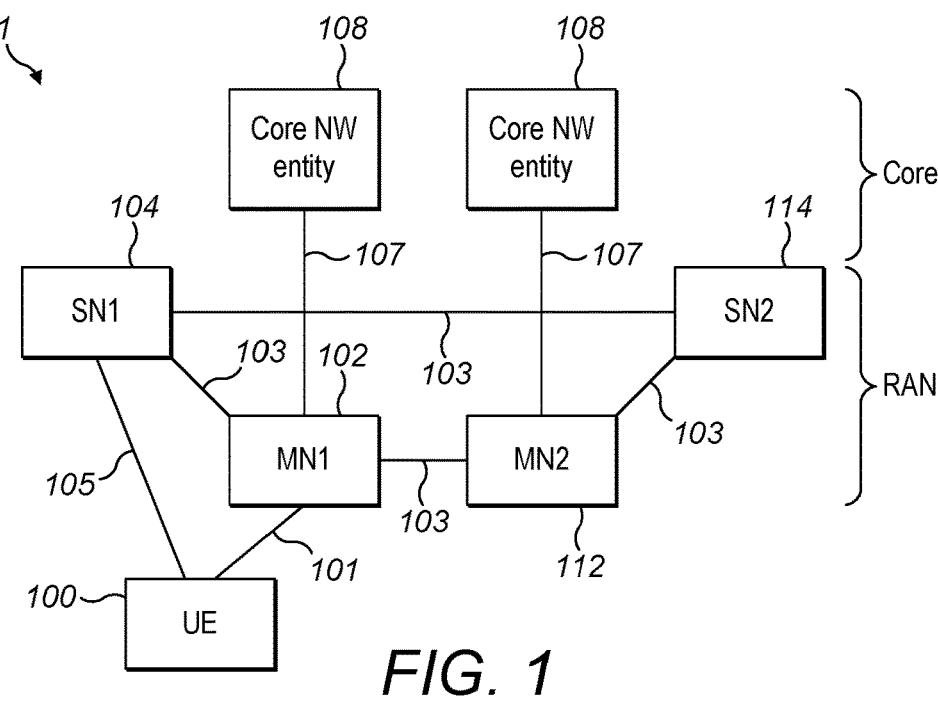
FIG. 1 shows an example of the subject matter described herein.

FIG. 1 is a block diagram schematically illustrating a wireless communication network system 1 configured for multi-connectivity. In at least some examples the system 1 is a 3GPP-defined network system.

The system 1 of FIG. 1 comprises a UE 100, a RAN comprising at least a first node 102 and a second node 104, and a core network (NW) entity 108. FIG. 1 further illustrates a third node 112 and fourth node 114 of the RAN, enabling the UE 100 to change nodes during mobility.

The term 'node' herein refers to an access node. In a 3GPP-defined system 1 a node is a base station. A base station implementing NR is referred to as a gNB. A base station implementing E-UTRA is referred to as an eNB.

Figure 2:
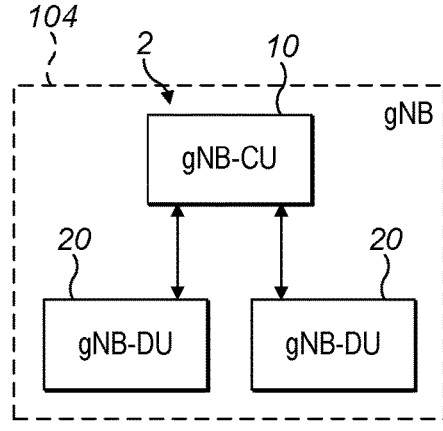
FIG. 2 shows another example of the subject matter described herein.

FIG. 2 illustrates an example of a node 104/114 (e.g. gNB) configured to implement a first radio access technology (RAT) (e.g. NR). In this example, the node 104 has a disaggregated (split) architecture. The gNB 104 comprises one or more distributed units (gNB-DU) 20 and a centralized unit (gNB-CU) 10. An apparatus 2 is configured to implement the functionality of at least part of a node 104, 114 such as a gNB-CU, and/or one or more gNB-DUs, or the whole gNB.

The gNB-CU 10 is a logical node configured to host a Radio Resource Control layer (RRC) and other layers of the gNB 120. The gNB-CU 10 controls the operation of one or more gNB-DUs 20. The gNB-DU 20 is a logical node configured to host a Radio Link Control Protocol layer (RLC), Medium Access Control layer (MAC) and Physical layer (PHY) of the access node (gNB) 120. The gNB-DU 20 communicates via a dedicated interface (F1) to the RRC layer hosted by the gNB-CU.

One gNB-DU 20 can support one or multiple cells (not illustrated in the figure). One cell is supported by only one gNB-DU 20.

Figure 3:
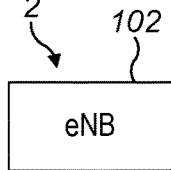
FIG. 3 shows another example of the subject matter described herein.

FIG. 3 illustrates an example of a node 102/112 (e.g. eNB) configured to implement a second RAT (e.g. E-UTRA). In this example, the node 102 does not have a disaggregated architecture. The eNB 102 is a logical node configured to host a Radio Resource Control layer (RRC) and other layers of the eNB 102. An apparatus 2 is configured to implement the functionality of at least part of a node 102, 112 such as an eNB.

Referring back to FIG. 1, the nodes 102, 104, 112, 114 are operably coupled to one another via a network interface 103. In an example implementation the network interface 103 comprises an X2 interface.

A UE 100 can operably couple to a node 102 via a radio interface 101. In this example, the radio interface 101 is a wireless interface. In an example implementation the radio interface 101 comprises a Uu interface. During multi-connectivity, the UE 100 can concurrently couple to another node 104 via a radio interface 105. In some examples, the radio interfaces 101, 105 comprise the same type of interface.

One node 102 to which the UE 100 is operably coupled can be configured to act as a Master Node (MN). The other node 104 to which the UE 100 is operably coupled can be configured to act as a Secondary Node (SN).

In FIG. 1, the first node 102 is a first Master Node (MN1), the second node 104 is a first Secondary Node (SN1), the third node 112 is a second Master Node (MN2), and the fourth node 114 is a second Secondary Node (SN2). In FIG. 1, MN1 102 and SN1 104 are serving (source) nodes.

At least a MN 102, 112 can operably couple to a core network entity 108, via an interface 107. A SN 104, 114 may operably couple to a core network entity 108. In FIG. 1, MN1 102 and MN2 112 are operably coupled to different core network entities 108 via the interface 107, or could be operably coupled to the same entity.

In a first example, the MN 102, 112 is an eNB configured to implement E-UTRA. The core network entity 108 comprises an Evolved Packet Core (EPC) entity. The entity 108 may comprise a Mobility Management Entity (MME) and/or a Service Gateway (S-GW). The interface 107 comprises an S1 interface.

In a second example, the MN 102, 112 is a gNB configured to implement NR. The core network entity 108 comprises a 5G Core (5GC) entity. The entity 108 may comprise an Access and Mobility Management Function (AMF). The interface 107 comprises an NG-C interface.

Examples of multi-connectivity are provided below. In most, but not all of these examples, a SN 104,114 implements a different RAT from the MN 102, 112.

One example is E-UTRA-NR Dual Connectivity (EN-DC), in which an eNB acts as a MN 102/112 and a gNB acts as a SN 104/114. This example is referred to throughout this specification. However, aspects of the present disclosure are also applicable to the other examples set out below.

Another example is next generation RAN (NG-RAN) E-UTRA-NR Dual Connectivity (NGEN-DC), in which an eNB (e.g. next generation eNB: ng-eNB) acts as a MN and a gNB acts as a SN.

Another example of dual-connectivity is NR-E-UTRA Dual Connectivity (NE-DC), in which a gNB acts as a MN and an ng-eNB acts as a SN.

Another example of dual-connectivity is NR-NR Dual Connectivity (NR-DC), in which one gNB acts as a MN and another gNB acts as a SN. In another example of NR-DC, a UE 100 is connected to two gNB-DUs, one serving a master cell group (MCG) and the other serving a secondary cell group (SCG), connected to the same gNB-CU, acting as a MN and as a SN.

In at least some examples of multi-connectivity, a node 102, 104, 112, 114 comprises a cell group of one or more cells. A cell group comprises a primary cell and zero or more secondary cells.

A cell relates to a geographical area with radio signal i.e. covered by a base station where a UE could connect and get service. A cell can be identified by lower layer Physical Cell Identity (PCI) and higher layer cell identity.

A primary cell is the cell, operating on a primary frequency, in which a UE 100 either performs an initial connection establishment procedure or initiates a connection re-establishment procedure, or is the cell indicated as the primary cell in a handover procedure. In at least some examples, a primary cell is a cell configured to provide Non-Access Stratum (NAS) mobility information during connection establishment, re-establishment or handover. The primary cell may be configured to provide security input during connection re-establishment or handover.

A secondary cell is the cell, operating on a secondary frequency, which may be configured once a RRC connection is established and which may be used to provide additional radio resources. Secondary Cells (SCells) can be configured to form a set of serving cells together with the PCell.

In multi-connectivity, a cell group of a MN 102/112 is a master cell group (MCG). A cell group of a SN 104/114 is a secondary cell group (SCG). A MCG comprises a primary cell (PCell) and zero or more secondary cells (SCells). A SCG comprises a primary secondary cell (PSCell) and zero or more secondary cells (SCells). In at least some examples, MCGs and SCGs comprise at least one SCell in addition to a PCell or a PSCell.

When multi-connectivity is first established, a UE 100 stores a configuration in memory. The configuration comprises information identifying a MCG including a PCell and zero or more SCells, and a SCG including a PSCell and zero or more SCells, and one or more bearers.

The configuration may include one or more of: information for measurement configuration; information for mobility control; radio resource configuration information (including radio bearers, MAC main configuration and physical channel configuration); and/or an Access Stratum (AS) security configuration.

After applying (executing) a configuration, the UE 100 can be configured to receive and transmit data over MCG and SCG bearers using radio links provided by the MN and the SN.

A multi-connectivity connection can be reconfigured by transmitting a reconfiguration message, to be executed by the UE 100. When executed, the stored configuration is updated. 3GPP standard 37.340 for multi-connectivity defines reconfiguration messages as RRC reconfiguration messages.

An SN-initiated RRC Reconfiguration message can be sent from a PSCell or from a SCell, or both in the case of carrier aggregation duplication. A MN-initiated RRC Reconfiguration message can be sent from a PCell or from a SCell, or both.

Examples of the present disclosure refer to reconfiguration messages which enable mobility procedures to be performed. Mobility refers to the capability of the UE 100 to move without a loss of service. A mobility procedure refers to a process for ensuring that the UE 100 has an optimum configuration during mobility. A mobility procedure may involve a configuration update. A mobility procedure can be performed at the UE 100, prompted by a reconfiguration message.

Examples of reconfiguration messages for mobility procedures in multi-connectivity include, but are not limited to:
  a) SN Modification (MN/SN initiated) for modifying, establishing (adding) or releasing (removing) bearer contexts (configurations/properties), to transfer bearers to and from the SN 104, or to modify other properties of the UE context within the same SN 104. Examples include the addition, modification or release of SCG bearer(s) and the SCG RLC bearer of split bearer(s), as well as configuration changes for SN-terminated MCG bearers. A bearer is a data tunnel associated with a termination point in the RAN or core network. Modification of a bearer may comprise changing a termination point, e.g. from MN to SN, changing the mapping of quality of service (QoS) flows to radio bearers, changing logical channel identities, changing RLC bearer properties including timers, changing RLC mode e.g. changing Service Data Adaptation Protocol (SDAP), Packet Data Convergence Protocol (PDCP) and RLC properties.
  b) SN Change (MN/SN initiated) to transfer a UE context from a source SN 104 to a target SN 114 and to change the SCG configuration in the UE 100 from the source SN 104 to that of the target SN 114.
  c) Inter-MN handover (with/without MN-initiated SN change) to transfer context data from a source MN 102 to a target MN 112 while the context at the SN 104 is kept or moved to another SN 114. During an Inter-MN handover, the target MN 112 may decide whether to keep or change the source SN 104, or release the source SN 104.

Figure 4:
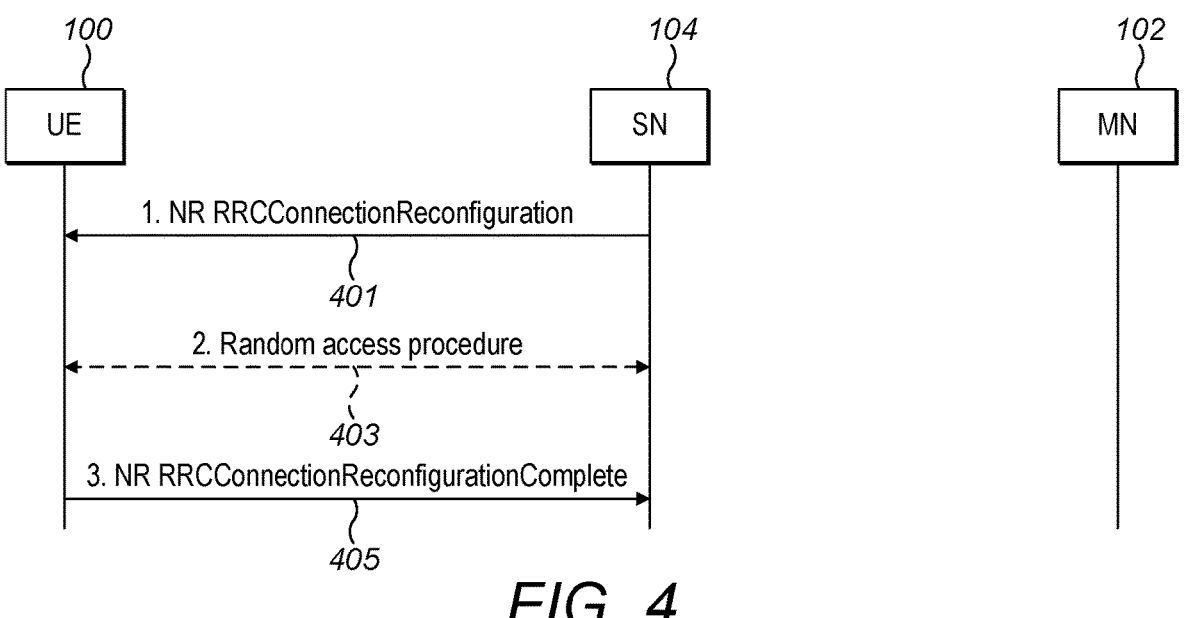
FIG. 4 shows another example of the subject matter described herein.

FIG. 4 is a message sequence chart illustrating an example reconfiguration message comprising a SN-initiated SN modification mobility procedure without MN involvement. Since the SN 104 does not change, this is referred to as an intra-SN reconfiguration message.

Such reconfiguration messages can be used to modify the configuration of the SN 104 in case no coordination with the MN 102 is required. This includes the addition, modification and release of SCG Scell(s), and PSCell changes, without changing the SN 104. In at least the below-described examples, the reconfiguration message comprises a PSCell change.

In operation 401, the SN 104 sends a RRC reconfiguration message ('NR RRCConnectionReconfiguration') to the UE 100 prompting (triggering) the UE 100 to perform the SN modification mobility procedure. The RRC reconfiguration message may comprise a target SCG, different from a current SCG but still associated with the same SN 104.

The message may be sent over a bearer such as Signal Radio Bearer 3 (SRB3). The UE 100 executes the RRC reconfiguration message to modify (e.g. replace/update) its stored configuration.

In case the UE 100 is unable to comply with at least part of the configuration included in the RRC Reconfiguration message, the UE 100 may perform a reconfiguration failure procedure.

In operation 403, If instructed by SN 104, the UE 100 performs access to the new target PSCell ('random access procedure'). The procedure may comprise synchronisation towards the target PSCell of the SN 104. Performing access may comprise a RACH process (random access channel process).

In operation 405, the UE 100 sends a reply ('NR RRC-ConnectionReconfigurationComplete') to the SN 104, reporting that a configuration of the reconfiguration message has been applied (e.g. that the UE 100 has modified its stored configuration to the new configuration enabled by the RRC reconfiguration message).

Figure 5:
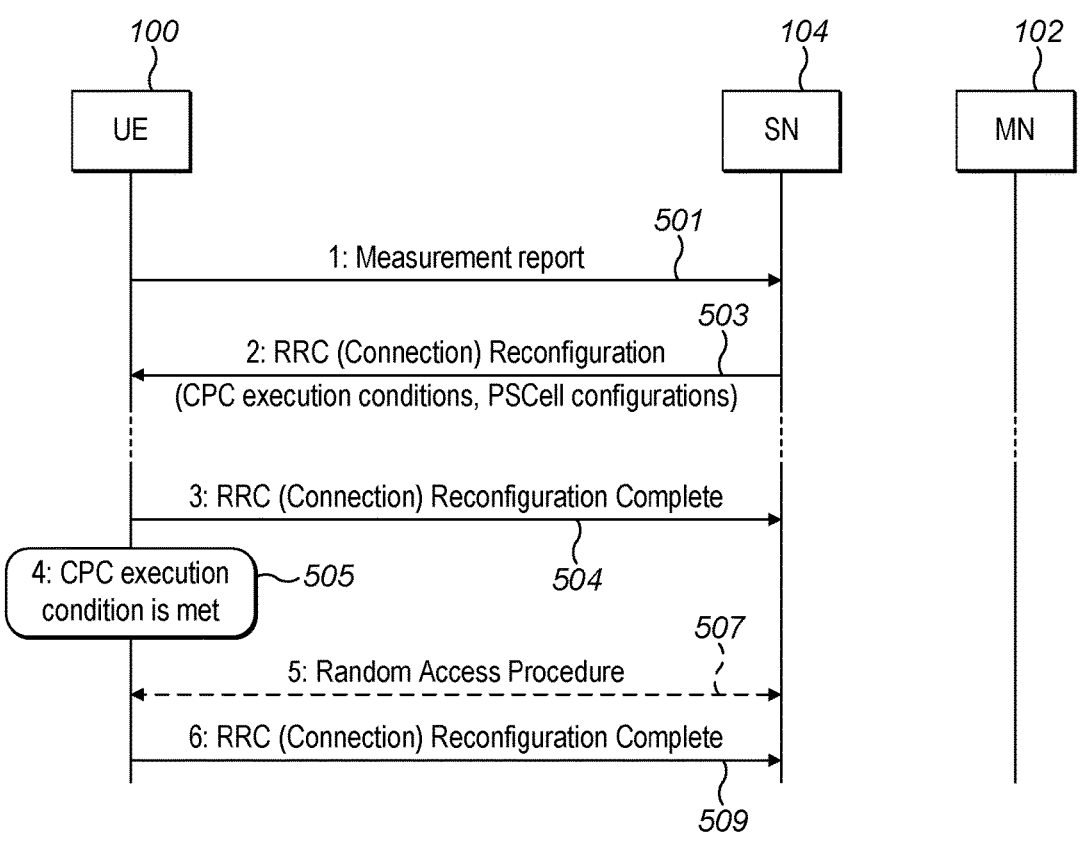
FIG. 5 shows another example of the subject matter described herein.

In at least some examples, a mobility procedure can be a conditional mobility procedure. The reconfiguration message can be regarded as a conditional reconfiguration message. This is illustrated in FIG. 5, which illustrates an example of a conditional PSCell change (CPC). Like FIG. 4, the illustrated reconfiguration message is a SN-initiated SN modification mobility procedure without MN involvement.

Operation 501 comprises the UE 100 sending measurements to the SN 104 ('measurement report'). The measurements may comprise signal power and/or signal quality measurements, such as Reference Signal Receive Power (RSRP) or Reference Signature Received Quality (RSRQ). Upon receiving the measurements from the UE 100, the Source SN 104 may prepare multiple candidate target PSCells in the same SN 104 in dependence on the measurements. The term 'Source' means a currently serving node or cell. Preparing candidate target PSCells may comprise reserving resources such as RACH resources (contention-free random-access preamble), Cell Radio Network Temporary Identifier (C-RNTI), or radio resources for guaranteed bit rate services, etc.

Operation 503 comprises the source PSCell sending to the UE 100 a RRC reconfiguration message ('RRC (Connection) Reconfiguration') prompting (triggering) the UE 100 to perform the CPC mobility procedure. This is also referred to as a CPC reconfiguration message herein. This comprises sending to the UE 100 one or more CPC execution conditions, and sending to the UE 100 the configuration of the prepared candidate PSCell or PSCells. CPC execution conditions can be offset-based and/or threshold-based, for example. An offset-based condition can be satisfied when $Mt>Ms+Offset$, wherein Mt is the measurement of the target PSCell, Ms is the measurement of the serving PSCell, and the offset is a configured offset. A threshold-based condition can be satisfied when $Ms<threshold1$ (Ms becomes worse than threshold1) and $Mt>threshold2$ (Mt becomes better than threshold2). Both the offset method and the threshold method could be applied concurrently and if at least one is satisfied, the CPC execution condition could be satisfied.

In operation 504, the UE 100 sends a reply ('RRC (Connection) Reconfiguration Complete') to the SN 104, reporting that the reconfiguration has been applied. In FIG. 5, the report that the reconfiguration has been applied is sent prior to satisfaction of the CPC execution condition. The term 'applied' here does not mean that the UE has finished executing the instructions (e.g. CPC execution condition) of the RRC reconfiguration message.

Operation 505 comprises the UE 100 determining that the CPC execution condition is satisfied. For example, the UE 100 may determine that a particular cell of the SN 104 satisfies the execution condition, and may select that cell as the new PSCell, Operation 507 is similar to operation 403 and is performed in dependence on satisfaction of the condition.

Operation 509 is similar to operation 504 but is sent to the new PSCell, indicating that the UE has completed the CPC execution procedure (e.g. the UE 100 has performed operation 507).

Figure 6:
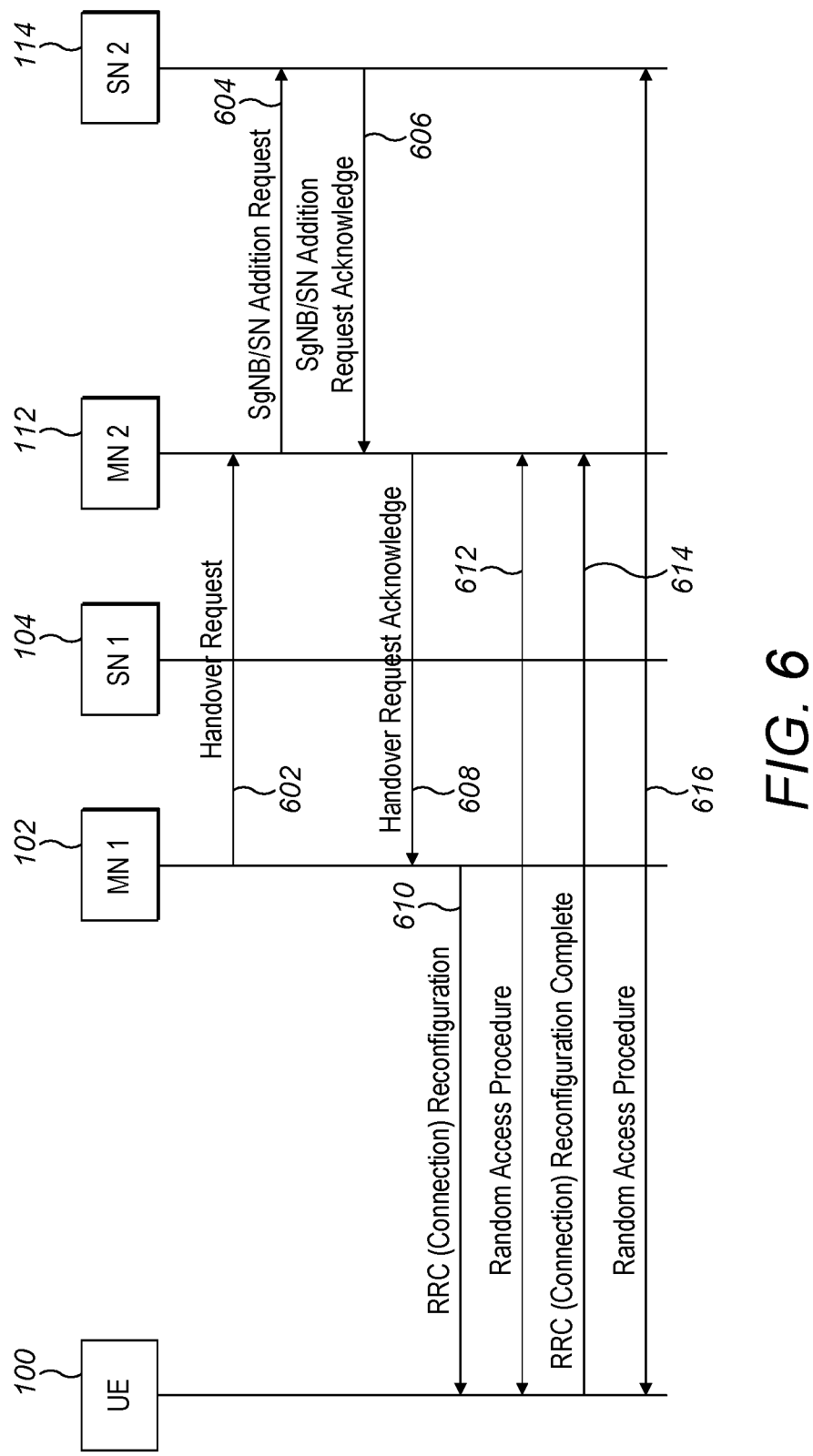
FIG. 6 shows another example of the subject matter described herein.

FIG. 6 is a message sequence chart illustrating an example inter-MN handover mobility procedure (with/without MN-initiated SN change). In FIG. 6, but not necessarily all examples the handover includes an inter-SN change.

When source MN1 102 initiates the handover, the MN1 102 at operation 602 sends a request to the target MN2 112. The request may be a Handover Request (HO-REQ) message. The target MN2 112 is decided by the MN1 102 based on Measurement report from UE. The target MN2 112 may be one of a set of one or more candidate MNs to which the request is sent.

If the target MN2 112 decides to change the SN, the target MN may send an addition request (e.g. SgNB Addition Request) to a target SN2 114 as shown in operation 604. The (target) SN replies with an acknowledgement such as an SgNB/SN Addition Request Acknowledge, as shown in operation 606. The acknowledgement may comprise reconfiguration message information indicative of a new configuration such as the target SCG configuration of SN2 114, comprising a target PSCell. This reconfiguration message information may include an indication of whether a full configuration or a delta SCG configuration is to be provided to the UE 100.

A delta configuration is dependent on a reference source configuration stored in the UE 100 whereas a full configuration is not dependent on a source configuration. A delta configuration is a delta (difference) update that only provides the UE 100 with the parts of the configuration that have changed. The UE 100 applies those parts on top of the existing source configuration (e.g. SCG configuration), to save time and bandwidth. By contrast, a full configuration comprises a whole configuration.

If the target MN instead decides to keep the source SN1 104, the addition request may instead be sent to the Source SN1 104. The Source SN1 104 may decide to keep or change its SCG configuration and may provide a target SCG configuration with its acknowledgement.

If the handover terminates multi-connectivity and reverts to single connectivity operation, the MN2 112 may not send an addition request to a SN and no target SCG configuration may be received.

In view of the above, there are a plurality of potential use cases for target SCG configurations during a handover:
No target SCG configuration (e.g. handover to single-connectivity);
Full target SCG configuration;
Delta target SCG configuration; and/or
An indication that the same SCG is to be used.

At operation 608, MN2 112 sends to MN1 102 a response to the handover request. The response may be a Handover Request Acknowledge message. The response may include a target SCG configuration and may include forwarding addresses.

At operation 610 the MN1 102 provides to the UE 100 an RRC reconfiguration message prompting (triggering) the UE 100 to perform the handover mobility procedure. This is also referred to as a CHO reconfiguration message herein. This may comprise executing target MCG and SCG configurations.

At operations 612 and 614 the UE 100 synchronises to the target MN2 112, comprising a random access procedure at operation 612 and a report that a configuration has been applied. At operation 616 the UE 100 synchronises to the target SN2 114 if required.

In at least some examples, a handover mobility procedure can be a conditional handover (CHO). Both CHO and CPC are mechanisms to improve mobility robustness but for different mobility scenarios.

With CHO, the UE mobility between master nodes is improved by the network providing conditional handover configurations for prepared target MNs along with CHO execution (triggering) conditions which are evaluated by the UE for triggering the handover, i.e., UE 100 triggers the CHO execution when one of the CHO execution conditions is met. CPC improves the mobility robustness and fastens the execution of UE mobility between PSCells while maintaining the PCell.

CHO execution conditions can optionally include at least some of the same types of conditions as CPC execution conditions defined earlier, and optionally one or more different conditions.

Some, but not necessarily all examples of the disclosure relate to the handling of a plurality of conditional mobility procedures comprising a first conditional mobility procedure (e.g. CPC) comprising a first configuration (e.g. target SCG) initiated by a first network node (e.g. source SN), and a second conditional mobility procedure (e.g. CHO) comprising a second configuration (e.g. target SCG configuration) initiated by a second network node (e.g. source MN).

In Rel-16 of 3GPP standard 37.340, simultaneous operation of CHO and CPC are not supported. The network ensures that CPC is not enabled when CHO is configured towards the UE 100.

As the CPC and CHO configurations are provided independently by the MN 102 and SN 104, it is possible if not for the restriction that when the UE 100 receives a CHO configuration the UE 100 may have a CPC configuration from the SN 104 (without MN involvement) already pending, i.e., UE 100 has at least one CPC configuration for a prepared target PSCell and is evaluating the CPC execution condition, and vice-versa. This scenario is illustrated in FIG. 7.

Figure 7:
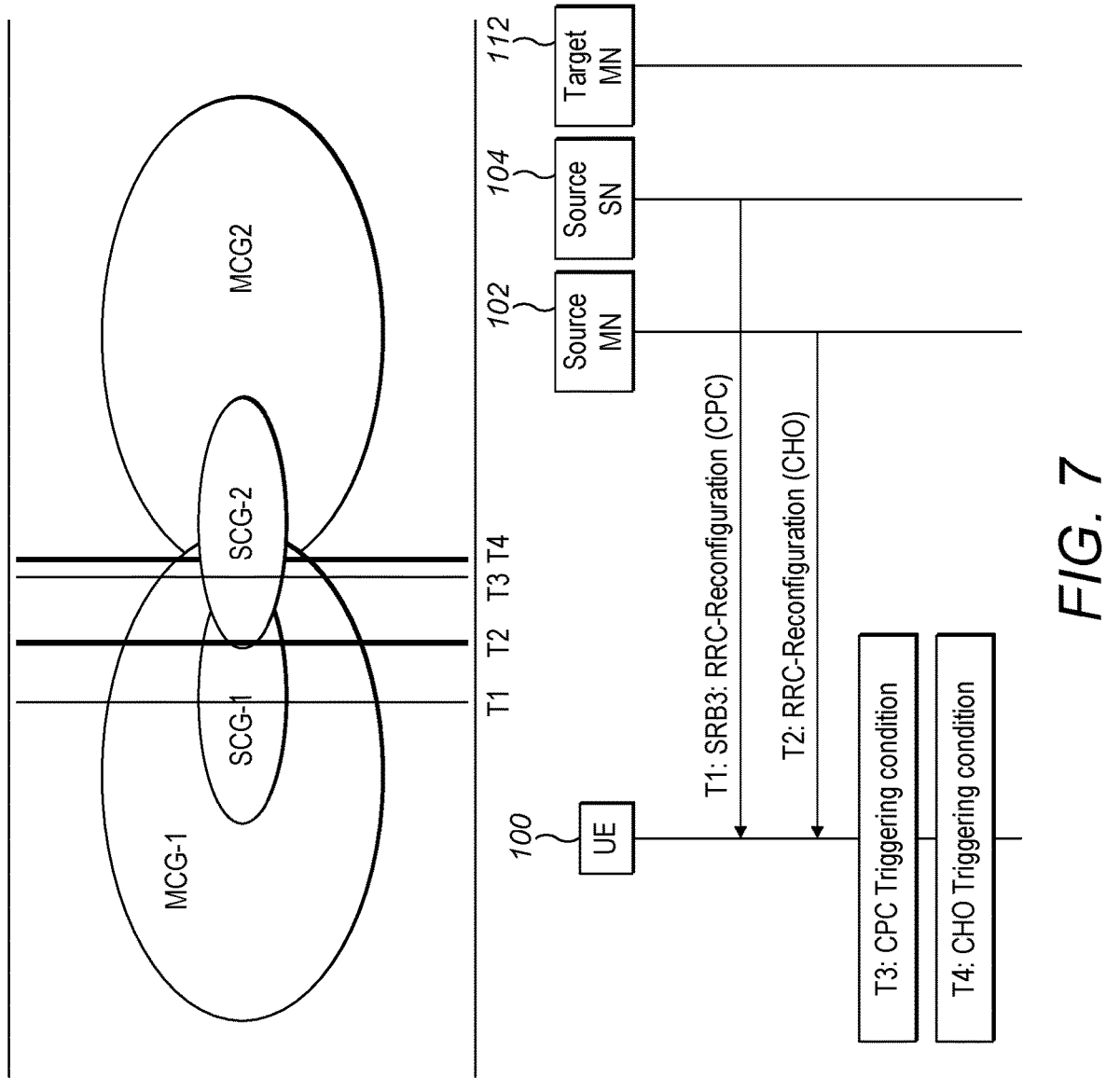
FIG. 7 shows another example of the subject matter described herein.

At time T1, FIG. 7 shows the UE 100 within MCG-1 of MN 102 and within the smaller SCG-1 sub-area of SN 104, at the time that the CPC reconfiguration message is received by the UE 100 from SN 104 without MN involvement.

At time T2, FIG. 7 shows that the UE 100 has moved towards SCG-2 (different SN 114) and MCG2 (different MN/PCell 112) but a CPC execution (triggering) condition has not yet been met. At this time, a measurement report from the UE 100 to MN1 102 has indicated possible mobility from the source PCell (Source MN 102) to a target PCell (Target MN 112, MCG2). Therefore, at this time a CHO RRC reconfiguration message is received by the UE 100 from the MN 102 without SN involvement.

At time T3, FIG. 7 shows that the UE 100 has left SCG-1 and moved into SCG2, but has not yet left MCG-1 or entered MCG2. Time T3 is the point at which a CPC execution (triggering) condition is met (the mobility criteria for reconfiguring from SCG-1 to SCG-2 has been met). Therefore, the UE 100 changes its current (source) SCG.

At time T4, a CHO execution condition is met. However, as the source SCG configuration is no longer the same as it was during CHO preparation, the UE may be unable to apply the target SCG configuration of the CHO in all situations. This could lead to failed handover.

While the restriction forbidding simultaneous CHO-CPC addresses the above scenario, the restriction causes its own problems for CPC after CHO as given below:

UE 100 sends to MN 102 a measurement report indicating possible mobility from source PCell (MN 102) to Target PCell (MN 112).

Source node (MN 102) prepares one or multiple target PCells (including target MN 112) and sends a CHO command to UE 100 with associated CHO triggering condition. As the CHO is configured towards UE 100, the SN 104 is not allowed to configure CPC towards UE 100.

UE 100 is also moving from PSCell-1 to PSCell-2 at the same time and sends measurement report to SN 104 via SRB3.

As the CHO is pending, SN 104 will not provide a CPC command for the UE 100 due to the restriction.

As the UE 100 is moving out of source PSCell during the window of CHO execution, Secondary node RLF (S-RLF) may happen. When the S-RLF is reported to the source MN 102, the source MN 102 may need to send another RRC reconfiguration message to reconfigure the bearers mapped to the SCG to another SCG or MCG or wait for the pending CHO to be executed. If the source MN 102 does not take any action waiting for the CHO to be executed, there will be additional interruption for the SGG bearers. If the source MN 102 decides to send a RRC reconfiguration message, it and evaluation of CHO and CPC commands, enabling execution of these commands depending on the order they happen without cancelling either of the commands.

For allowing coexistence of conditional reconfigurations from both network nodes 102, 104, any dependencies associated with these two configurations may be considered to avoid any configuration mismatch during execution. The situation is explained below.

RRC Reconfiguration messages sent towards the UE 100 normally contain the delta configuration with respect to the current configuration. The UE 100 applies the changes received in the RRC Reconfiguration message over the current source configuration.

For a CHO when the UE 100 has dual connectivity, the target MN 112 prepares the delta target MCG/SCG configuration based on the current MCG of the source MN 102 and the current SCG of the source SN configuration at the time of CHO preparation as a reference.

In case the CPC is allowed simultaneously with CHO and if CPC is executed prior to CHO, the source SCG configuration has changed at UE and is now different from the source SCG configuration that has been used by the target MN for CHO preparation. If CHO is executed later, the UE applies the target SCG configuration of the CHO by using the latest source SCG configuration as reference, which is not the same as the source SCG configuration based on which the target MN 112 has prepared its CHO target SCG configuration. This could lead to handover execution failure or later failure due to mismatch of configuration.

Depending on the target CHO configuration, the CPC can be allowed when the target SCG configuration of the CHO does not have dependency on the source SCG configuration of the UE 100, or when the target SCG configuration maintains the same configuration as the source SCG configuration. The Table below summarises different use cases where CPC can be allowed prior to CHO—in other words sequential execution of the first and second conditional mobility procedures is enabled.

| Target SCG Configuration in CHO configuration | Source SCG-CPC Enabled |
|---|---|
| None (handover to single-connectivity) | Yes |
| New PSCell: Full SCG configuration (Release-and-Add) | Yes |
| New PSCell: Delta SCG configuration over Source SCG configuration | Yes, with release of the target SCG configuration. This is described in more detail later. Optionally, a check may be performed of whether it is acceptable to release the target SCG configuration. This is described in more detail later. In another embodiment: No - ongoing CPC is terminated. |
| Same SCG as source SCG configuration | Yes. Optionally, a UE capability split condition must also be satisfied. With this condition, the CPC configuration further needs to ensure that the split of capability between MCG and SCG of the CPC configuration is substantially the same as the split of capability between MCG and SCG of the CHO configuration. This is described in more detail later. | may not be reliable as the UE 100 is already moving out of source PCell (coverage area of MN 102) and also this reconfiguration may have an impact on the pending CHO.

Examples provided below propose mechanisms to obviate the above problems and allow the simultaneous reception In at least some examples the network can indicate to the UE 100 whether sequential execution of CHO and CPC is allowed.

In an example implementation based on the above Table, CPC before CHO is not allowed when:

Target SCG configuration is a delta configuration and release of the target SCG configuration during CHO execution is not acceptable. Alternatively, ongoing CPC is terminated if the target SCG configuration of CHO is a delta configuration.

Target SCG configuration is the same as the source SCG configuration, but the UE capability split condition is not satisfied.

In the above implementation if CPC before CHO is not allowed then the ongoing CPC will be terminated. The term 'terminated' does not necessarily require that the UE 100 stops evaluating CPC execution conditions. CPC evaluation might still continue but if a CPC execution condition is met earlier than CHO then the CPC execution condition is ignored (PSCell change not executed). In another embodiment termination comprises stopping evaluation of CPC execution conditions.

In the example implementation, CPC before CHO is allowed when:

There is no target SCG configuration (handover to single connectivity).

Target SCG configuration is a full configuration not dependent on a source configuration.

Target SCG configuration is a delta configuration, and release of the target SCG configuration during CHO execution is acceptable.

Target SCG configuration is the same as the source SCG configuration, and the UE capability split condition is satisfied.

The delta SCG configuration scenario is now described in more detail.

Releasing the target delta SCG configuration means that the UE 100 releases the SCG part of the CHO configuration but will still be allowed to apply the MCG part of the CHO configuration and complete the handover. As a result of releasing the target SCG configuration, the UE 100 will not attempt to apply the delta SCG configuration because the CPC has changed the source configuration so the delta configuration may not work.

In some, but not necessarily all examples the UE 100 may also release the source SCG configuration which changed as a result of the CPC, as well as releasing the target SCG configuration. The UE 100 will now not have a SCG configuration. At a suitable point in time the UE 100 can add a new SCG configuration.

When the UE 100 releases a target SCG configuration, the UE 100 may report to the SN 104/114 that the UE 100 has released the SCG configuration.

In another embodiment, the UE 100 may not release the current source SCG configuration. Instead, the UE 100 may not execute the ongoing CPC if the CHO reconfiguration message is received after receiving a CPC reconfiguration message but before satisfaction of a CPC execution condition. That is, the UE 100 may stop monitoring for satisfaction of a CPC execution condition.

Optionally, a check may be performed by the target MN 112 of whether it is acceptable to release the target SCG configuration, i.e. whether reduced handover completion without a target SCG is acceptable or not. If acceptable, the ongoing CPC is allowed to execute followed by the CHO without a SCG change. If not acceptable, the ongoing CPC may be terminated to ensure that the UE 100 retains its source configuration to which the new delta target SCG configuration can be applied.

In at least some examples, whether or not the release is acceptable depends on a bearer mapping of the target SCG configuration. Acceptability may depend on a target radio bearer mapping configuration between MCG and SCG. The release may be allowed if split bearers are mapped to the UE 100 according to the target. A split bearer is defined as a radio bearer with RLC bearers both in MCG and SCG. The release may not be allowed if there are some bearers fully mapped to the SCG (referred to as SCG-only bearers, not split-bearers) and if said bearers are time-sensitive at the time of handover, as it is desirable in this instance not to suspend bearer traffic between MN and SN). Bearers may have high requirements with regards interruption time so release of these bearers at handover may lead to additional interruptions which may not be acceptable. An example of a time-sensitive bearer is a bearer with a below-threshold interruption time requirement.

The 'Same SCG' configuration scenario is now described in more detail.

The term 'same SCG' is defined as the target SCG configuration indicating that the current source SCG configuration is to be maintained. The term 'same' refers to the same SCG but the data contained in the configurations do not necessarily have to be identical in every respect, for example a security key change may be indicated.

Even if the SCG is the same, the usage of UE capabilities after CPC and CHO may in some instances not respect the total UE capabilities. Therefore, if the network does not ensure that the split of UE capabilities is the same, the second execution (e.g. CHO) may in some instances exceed total UE capability and could result in RLF.

UE capabilities refer to information contained in a RRC UE capability information message. Examples of UE capability categories for E-UTRA include supported modulation schemes, the maximum number of layers used for spatial multiplexing, the maximum number of bits which can be received/transmitted in a transmission time interval. Examples of UE capabilities for NR include support for a specific number of spatial multiplexing layers (MIMO-Layers) in uplink/downlink, supported modulation schemes, etc.

During multi-connectivity, UE capabilities may require coordination between RATs (e.g. S-UTRA and NR). Such capabilities include, for example, band combinations, baseband processing capabilities, and the maximum power for Frequency Range 1 (sub-6 GHz bands) the UE 100 can use in SCG. It is up to the serving MN 102 to split UE capabilities between MN and SN configurations. The MN may then provide to the SN the UE capabilities usable for SCG configuration, comprising a list of allowed multi-connectivity band combinations and feature sets. The SN indicates the selected band combination and feature set to the MN.

Therefore, to further improve reliability an optional check on the resource reservation at MCG and SCG is checked against UE capability. This is referred to herein as a UE capability split condition. The UE capability split condition may be checked as part of the Addition Request procedure at Target MN 112. With this condition, the CPC configuration further needs to ensure that the split of UE capability between MCG and SCG of the CPC configuration is substantially the same as the split of UE capability between MCG and SCG of the CHO configuration.

The check may be performed by a target node of the CHO/CPC. The check ensures that the new post-CHO split between modified SCG and target MCG is within the UE capabilities. If the check fails, an ongoing CPC should be terminated. If the check succeeds, CPC before CHO with the same SCG configuration is allowed.

In at least some examples the checks mentioned above may be performed in the network. Then, the MN 102 sends to the UE 100 information such as a message (e.g. part of the CHO reconfiguration message), the information including a controlling parameter for indicating whether the CPC execution before CHO execution is allowed or not, and/or whether CPC execution after CHO execution is allowed or not, and/or whether CHO with target SCG configuration release is allowed.

If CPC execution prior to CHO is allowed, the UE 100 may concurrently evaluate both CPC and CHO conditions and the UE 100 can continue to evaluate the CHO condition after CPC execution. The term 'sequential execution' herein refers to enabling coexistence of CPC and CHO without cancellation of one of them, and in at least some examples refers to concurrently evaluating both CPC and CHO conditions.

If CPC execution after CHO is allowed, the UE 100 does not need to cancel the pending CPC after CHO execution. The UE 100 can continue to evaluate the CPC condition after CHO execution.

In some, but not necessarily all examples if release of the target SCG configuration is required (e.g. because it is a delta configuration), the MN 102 may indicate with the CHO reconfiguration message that if CPC is executed prior to CHO, the CHO configuration should be modified to release the SCG. The timing of CPC/CHO execution depends on which execution conditions are met first.

In the case of a delta configuration, the controlling parameter may indicate whether CPC before CHO is allowed with release of the target SCG configuration, or an ongoing CPC should be terminated to ensure that the target SCG configuration of the CHO succeeds.

In the case of a full configuration, the controlling parameter may allow sequential execution of CHO and CPC including sequential execution of the first and second SCG configurations without releasing the target SCG configuration.

In the case of no target SCG configuration, the controlling parameter may be either omitted or sent anyway to indicate that sequential execution is allowed.

In the case of a same SCG configuration, the controlling parameter may indicate whether an ongoing CPC should be terminated to ensure that the split of UE capabilities is maintained.

In some, but not necessarily all examples the CHO reconfiguration message may contain multiple target CHO configurations of prepared target MNs. The multiple targets may individually comprise different values of the controlling parameter for sequential execution of the CPC and CHO. In this case, the UE 100 may perform the sequential execution if allowed by the controlling parameters of the best 'N' cells. 'N' can be configured by the MN 102 or 112 for example. In an example, the term 'best' refers to the target nodes which are most likely to satisfy a CHO execution condition, for instance the target nodes with the strongest radio measurement.

In an example where the set 'N' comprises two or more target MNs, sequential execution is allowed if allowed by all of the target MNs in the set N, but not allowed if at least one of the target MNs in the set N does not allow sequential execution.

Figure 8:
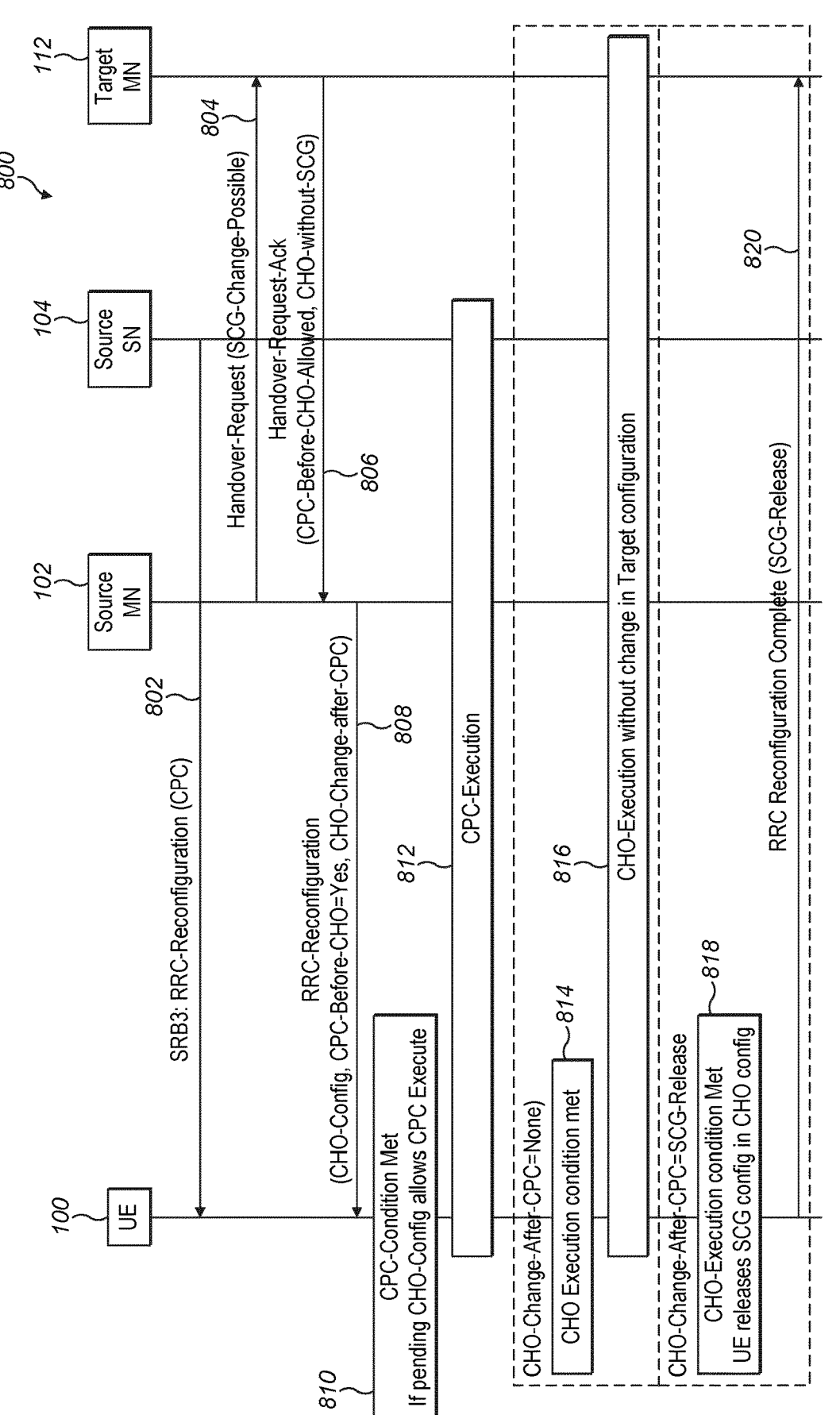
FIG. 8 shows another example of the subject matter described herein.

FIG. 8 is an example message sequence chart setting out an example method 800 for controlling sequential execution of a plurality of conditional mobility procedures. This example refers to CPC and CHO procedures where the first network node is the SN and the second network node is the MN, but it would be appreciated that this method can apply to other types of conditional mobility procedures and use cases.

In this method the target network node (MN 112) of the CHO provides information along with the prepared CHO configuration on whether CPC can be allowed for the given configuration or not. In FIG. 8 but not necessarily all examples, CPC occurs before CHO.

Operation 802 is a message sent from the SN 104 to the UE 100 prompting the UE 100 to perform the CPC. The message may be a CPC reconfiguration message similar to operation 503 described earlier. The message is SN-initiated by the source SN 104, without MN involvement.

The UE 100 starts monitoring the CPC execution conditions, and may optionally reply (not shown) to the SN 104 reporting that the conditional reconfiguration message has been applied, prior to satisfaction of a CPC execution condition.

In one embodiment, the source SN 104 may inform the MN 102 that the SN 104 has configured the UE 100 with a CPC without MN involvement (not shown). At this stage, the SN 104 may be unable to confirm to the MN 102 which SCG configuration the UE 100 will ultimately adopt. In another embodiment, the MN 102 remains unaware of the CPC.

Operation 804 is a request (e.g. Handover Request) associated with the CHO, sent from the MN 102 to the target MN 112. This request is similar to operation 602 described earlier. The decision to trigger a handover may be MN-initiated by the source MN 102 based on UE measurements, without SN involvement.

If the MN 102 is aware of the CPC, the MN 102 can send to the target MN 112 an indication ('SCG-Change-Possible') that the CPC has been initiated by the SN 104. This indication could be with the Handover Request message. This indicates the possibility of a SCG change prior to CHO execution.

Upon receiving the handover request, the target MN 112 prepares a response (e.g. 'Handover Request Acknowledge' message). The preparation may comprise the earlier-described messages of operations 604 and 606 (not shown here), enabling the target MN 112 to obtain the target SCG configuration (if any) from a source SN 104 or target SN 114 (depending on whether SN change is required)

At operation 806 the target MN 112 sends to the MN 102 the response to the handover request ('Handover Request Acknowledge' message). This is similar to operation 608. However, in this method 800 the target MN 112 in response provides information (e.g. flags) for controlling the sequential CHO-CPC execution along with the target SCG configuration of the CHO configuration. The flags could be Boolean flags.

The information may comprise a first flag ('CPC-Before-CHO-Allowed'). The first flag indicates whether a CPC is allowed to continue before CHO execution (whether source SCG change can be allowed prior to CHO execution or not). The first flag may allow CPC before CHO when the CHO configuration does not have a target SCG configuration or when the target SCG configuration is a full configuration.

The information may also comprise a second flag ('CHO-without-SCG') indicating whether handover completion without a target SCG configuration is acceptable or not. This second flag enables the source MN 102 to decide on whether to allow release of the target SCG configuration.

Figure 9:
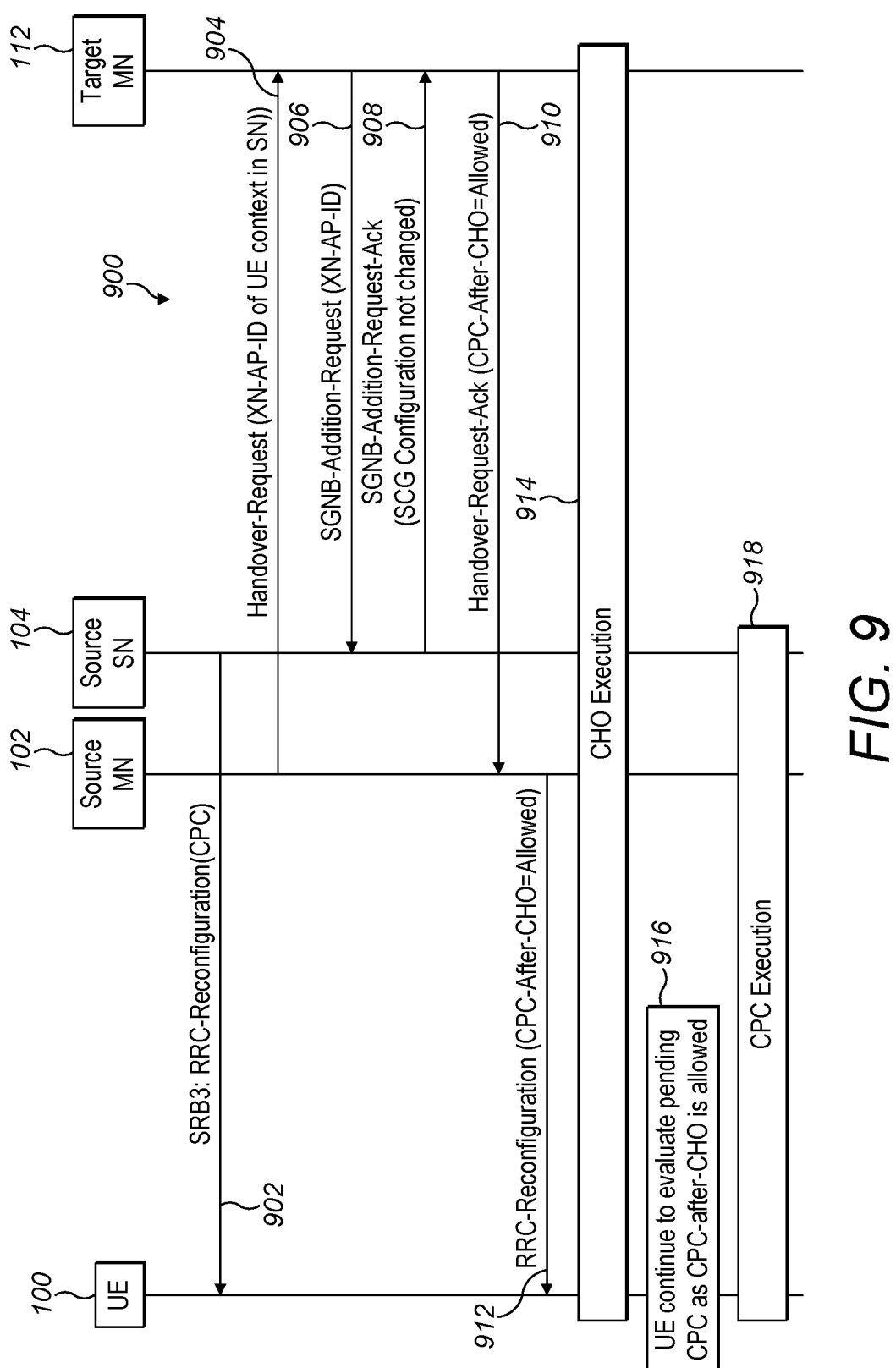
FIG. 9 shows another example of the subject matter described herein.

An example of a third flag ('CPC-After-CHO') for allowing CPC after CHO is described later in relation to FIG. 9.

Upon receiving the flags, the source MN 102 may determine one or more controlling parameters to send to the UE 100 in dependence on the flags. In an example implementation, up to three controlling parameters are sent:

First controlling parameter (FIG. 8)='CPC-Before-CHO'=Yes/No (e.g. Boolean flag). This is based at least on the first flag.

Second controlling parameter (FIG. 8)='CHO-Change-After-CPC'='SCG-Release' or 'None' (e.g. Boolean flag). This is based at least on the second flag.

Third controlling parameter (FIG. 9)='CPC-After-CHO'=Allowed/Not allowed (e.g. Boolean flag). This is based at least on the third flag.

The first controlling parameter determines whether the ongoing CPC can continue. If the first flag indicates a full target SCG configuration or no target SCG configuration, the first controlling parameter allows CPC before CHO.

In an example the first controlling parameter depends not only on the first flag but also the second flag. In the case of a delta target SCG configuration, if the second flag allows SCG release (CHO without SCG) then the first controlling parameter allows CPC before CHO. If the second flag does not allow SCG release then the first controlling parameter does not allow CPC before CHO.

Assuming that the ongoing CPC is allowed to continue, the second controlling parameter then controls the CHO execution.

The second controlling parameter could have the value 'SCG-Release' instructing release of the target SCG configuration during CHO execution, if the CHO configuration includes a delta target SCG configuration and if a CPC is executed first. The value 'SCG-Release' could be set when the second flag indicates that the SCG release is acceptable. The second controlling parameter could have the value 'None' or be omitted if there is no target SCG configuration.

The third controlling parameter is described later in relation to FIG. 9.

In the above examples, three flags are determined and three controlling parameters are determined. Alternatively, the flags could be merged into fewer flags and/or the controlling parameters could be merged into fewer controlling parameters.

In the above examples the determination of the or each of the controlling parameter(s) is the responsibility of the source MN 102 based on the coordination between the source MN 102 and the target MN 112 (e.g. flags from the target MN 112 to guide the determination). In other examples determination of at least one of the controlling parameter(s) is the responsibility of the UE based on the corresponding flag from the target MN 112. In other examples the responsibility resides in the target MN 112, in which case the flags from the target MN 112 are actually the controlling parameters. The responsibility could even be distributed between entities.

At operation 808 the source MN 102 sends to the UE 100 the CHO reconfiguration message with a CHO configuration (including target SCG configuration), similar to operation 610. However, in this method 800 the CHO reconfiguration message is provided with information for controlling sequential CHO-CPC execution. The information may comprise the first controlling parameter ('CPC-Before-CHO') and/or the second controlling parameter ('CHO-Change-after-CPC').

At operation 810 a CPC execution condition is met (satisfied). Operation 812 comprises CPC execution (e.g. similar to operations 507, 509). Operations 810, 812 are performed before CHO if the first and second controlling parameters permit sequential execution of CPC before CHO If the second controlling parameter indicates that there is no target SCG configuration ('CHO-Change-after-CPC=None'), operations 814 and 816 occur. At operation 814 a CHO execution condition is met. Operation 816 comprises CHO execution (e.g. similar to operations 612, 614) without a change of SCG configuration.

If the second controlling parameter instructs release of the target SCG configuration during CHO execution ('CHO-Change-after-CPC=SCG-Release'), operations 818 and 820 occur. At operation 818 a CHO execution condition is met. The UE 100 releases the target SCG configuration in the CHO configuration. The UE 100 may then perform CHO execution (e.g. similar to operation 816). Operation 820 is similar to the reporting operation 614 except that the report may include an indication that the target SCG configuration was released.

Although FIG. 8 shows CPC executing before CHO, it does not show the situation in which a CPC execution condition is met after operation 816 or 820. In some scenarios the CPC is still able to execute after a CHO. If the target MN 112 does not modify the current SCG configuration ('same SCG' as described) as part of handover, the CPC can be executed after CHO. This is because CHO execution does not modify the current SCG configuration other than minor changes such as security key changes. In this case pending CPC measurements and evaluations by the UE 100 can also be continued.

A message sequence chart where CPC execution occurs after CHO execution is given in FIG. 9 below, illustrating an example method 900. In summary, a third flag and third controlling parameter indicate whether CPC after CHO is allowed.

Operation 902 is a CPC reconfiguration request from SN 104 to UE 100 as per operation 802. Operation 904 is a Handover request from MN 102 to target MN 112 as per operation 804.

Operations 906 and 908 are an addition request and acknowledgement reply as per operations 604 and 606, which were omitted from FIG. 8 for illustrative purposes. In this example, the request and reply are between the target MN 112 and the source SN 104, wherein the reply indicates that the SCG configuration is not changed ('same SCG' scenario). For example, the reply may contain the same SCG configuration as the UE's current SCG configuration.

Operation 910 is a response to the handover request from target MN 112 to source MN 102 as per operation 806. However, in this instance a third flag indicates whether CPC after CHO is permitted ('CPC-After-CHO').

The third flag may be decided by the target MN 112 by checking the UE capability split condition described earlier.

The third flag enables the source MN 102 to determine a third controlling parameter ('CPC-After-CHO') based on the third flag. The third controlling parameter determines whether the ongoing CPC can continue after CHO execution, assuming that a CPC condition is still being monitored at the time of CHO execution.

Operation 912 is a CHO reconfiguration message similar to operation 810. In this method 900 the CHO reconfiguration message is provided with information such as the third controlling parameter ('CPC-After-CHO').

Operation 914 is CHO execution similar to operation 816. At this time the CPC execution condition is not yet met.

At operation 916 the UE continues to evaluate the pending CPC if CPC after CHO is allowed. At operation 918 CPC execution is performed. Operations 916 and 918 are omitted if CPC after CHO is not allowed.

Figure 10:
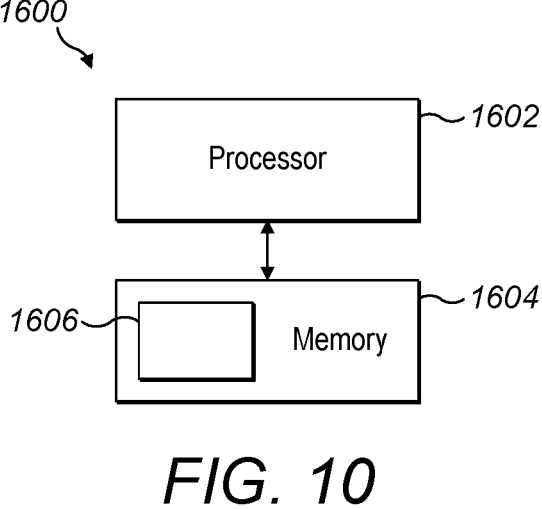
FIG. 10 shows another example of the subject matter described herein.
Figure 11:
FIG. 11 shows another example of the subject matter described herein.

FIG. 10 illustrates an example of a controller 1600. Implementation of a controller 1600 may be as controller circuitry. The controller 1600 may be implemented in hardware alone, have certain aspects in software including firmware alone or can be a combination of hardware and software (including firmware).

As illustrated in FIG. 10 the controller 1600 may be implemented using instructions that enable hardware functionality, for example, by using executable instructions of a computer program 1606 in a general-purpose or special-purpose processor 1602 that may be stored on a computer readable storage medium (disk, memory etc) to be executed by such a processor 1602.

The processor 1602 is configured to read from and write to the memory 1604. The processor 1602 may also comprise an output interface via which data and/or commands are output by the processor 1602 and an input interface via which data and/or commands are input to the processor 1602.

The memory 1604 stores a computer program 1606 comprising computer program instructions (computer program code) that controls the operation of the apparatus 2, 100 when loaded into the processor 1602. The computer program instructions, of the computer program 1606, provide the logic and routines that enables the apparatus to perform the methods illustrated in FIGS. 4-9. The processor 1602 by reading the memory 1604 is able to load and execute the computer program 1606.

The apparatus 2, 100 therefore comprises:

at least one processor 1602; and at least one memory 1604 including computer program code the at least one memory 1604 and the computer program code configured to, with the at least one processor 1602, cause the apparatus 2, 100 at least to perform:

controlling execution of a plurality of conditional mobility procedures, the conditional mobility procedures comprising a first conditional mobility procedure comprising a first configuration initiated by a first network node, and a second conditional mobility procedure comprising a second configuration initiated by a second network node, wherein controlling execution of the plurality of conditional mobility procedures comprises controlling sequential execution of the first and second conditional mobility procedures based on the first configuration and the second configuration.

If the apparatus 2 is configured to operate as the second network node (e.g. source MN 102), controlling sequential execution of the plurality of conditional mobility procedures may comprise performing at least some of the operations described in the methods 800, 900, including at least some of:

receiving an indication (e.g. from source SN 104) that the first conditional mobility procedure (e.g. CPC) is initiated by the first network node (e.g. SN 104); and initiating the second conditional mobility procedure (e.g. CHO) comprising at least some of the following operations:

operation 804/904: sending to a target network node (e.g. target MN 112) a request (e.g. Handover Request) associated with the second conditional mobility procedure (e.g. CHO), wherein the request may indicate that the first conditional mobility procedure is initiated by the first network node;

operation 806/910: receiving a response (e.g. Handover Request Acknowledge) from the target network node comprising configuration information (e.g. CHO configuration) including the second configuration (e.g. target SCG configuration) and information for controlling sequential execution of the first and second conditional mobility procedures, wherein the information comprises at least one flag (e.g. first, second and third flags) indicating whether sequential execution of the first and second conditional mobility procedures is permissible (e.g. before/after) or is permissible with release of the second configuration; and operation 808/912: based on the response, sending to the user equipment the second configuration (e.g. CHO reconfiguration message) and at least one controlling parameter (e.g. the first, second and third controlling parameters) comprising information for controlling sequential execution of the first and second conditional mobility procedures.

If the apparatus 2 is configured to operate as the target network node (e.g. target MN 112), controlling sequential execution of the plurality of conditional mobility procedures may comprise at least some of the operations described in the methods 800, 900, including at least some of:

operation 804/904: receiving the above-mentioned request (e.g. Handover Request);

operation 906: sending to the first network node (e.g. source SN 104) or a target secondary node (e.g. target SN 114) a request for the second configuration (e.g. Addition request);

operation 908: receiving in response to the addition request an acknowledgement from the first network node/target secondary node including the second configuration (e.g. target SCG configuration) or an indication to use an existing source configuration (e.g. same SCG);

operation 806/910: sending to the second network node (source MN 102) the response (e.g. Handover Request Acknowledge) as described above.

If the apparatus is configured to operate as the UE 100, controlling sequential execution of the plurality of conditional mobility procedures may comprise the mobile equipment 100 receiving a message (e.g. from MN 102 or 112) for controlling sequential execution of the first and second conditional mobility procedures based on the first configuration and the second configuration. The UE apparatus 100 may comprise means for performing at least some of the additional operations described in the methods 800, 900, including at least some of:

receiving a first reconfiguration message (e.g. CPC reconfiguration message) prompting the apparatus to perform the first conditional mobility procedure;

monitoring for satisfaction of a triggering condition of the first conditional mobility procedure;

receiving a second reconfiguration message (e.g. CHO reconfiguration message) prompting the apparatus to perform the second conditional mobility procedure, the second reconfiguration message including information for controlling sequential execution of the first and second conditional mobility procedures, wherein the information comprises at least one controlling parameter (e.g. the first, second and third controlling parameters);

based on the at least one controlling parameter, controlling sequential execution of the first and second conditional mobility procedures; and upon execution of the second conditional mobility procedure with release of the second configuration, sending a report (RRC reconfiguration complete message) to the target master node indicating completion of the second conditional mobility procedure, wherein the report comprises an indication that the second configuration was released during execution of the second conditional mobility procedure.

As illustrated in FIG. 1700, the computer program 1606 may arrive at the apparatus 2, 100 via any suitable delivery mechanism 1700. The delivery mechanism 1700 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 1606. The delivery mechanism may be a signal configured to reliably transfer the computer program 1606. The apparatus 2, 100 may propagate or transmit the computer program 1606 as a computer data signal.

Computer program instructions can cause a computer (e.g. apparatus, network node) to perform at least the following:

controlling execution of a plurality of conditional mobility procedures, the conditional mobility procedures comprising a first conditional mobility procedure comprising a first configuration initiated by a first network node, and a second conditional mobility procedure comprising a second configuration initiated by a second network node, wherein controlling execution of the plurality of conditional mobility procedures comprises controlling sequential execution of the first and second conditional mobility procedures based on the first configuration and the second configuration.

The computer program instructions may be comprised in a computer program, a non-transitory computer readable medium, a computer program product, a machine readable medium. In some but not necessarily all examples, the computer program instructions may be distributed over more than one computer program.

Although the memory 1604 is illustrated as a single component/circuitry it may be implemented as one or more separate components/circuitry some or all of which may be integrated/removable and/or may provide permanent/semi-permanent/dynamic/cached storage.

Although the processor 1602 is illustrated as a single component/circuitry it may be implemented as one or more separate components/circuitry some or all of which may be integrated/removable. The processor 1602 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 4-9 may represent steps in a method and/or sections of code in the computer program 1606. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims. For example the conditional mobility procedures could be from different network nodes than a SN and a MN. Both network nodes could implement the same radio access technology. The second mobility procedure could change a cell configuration without requiring a handover. The network could be other than a 3GPP-defined network.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

What is claimed is:

1. An apparatus comprising:
   at least one processor; and
   at least one memory including computer program code, the at least one memory and the computer program code being configured to, with the at least one processor, cause the apparatus to perform:
   controlling execution of a plurality of conditional mobility procedures, the plurality of conditional mobility procedures comprising a first conditional mobility procedure comprising a first configuration initiated by a first network node, and a second conditional mobility procedure comprising a second configuration initiated by a second network node,
   wherein controlling the execution of the plurality of conditional mobility procedures comprises controlling sequential execution of the first and second conditional mobility procedures-based on the first configuration and the second configuration,
   wherein controlling the sequential execution is based on dependency of the second configuration on a source configuration, and
   wherein the first configuration is configured to change the source configuration.

2. The apparatus of claim 1, wherein the at least one memory and the computer program code are configured to, with the at least one processor, further cause the apparatus to enable the sequential execution of the first and second conditional mobility procedures is the second configuration is a full configuration.

3. The apparatus of claim 1, wherein the at least one memory and the computer program code are configured to, with the at least one processor, further cause the apparatus to enable the sequential execution of the first and second conditional mobility procedures with release of the second configuration based on the second configuration being a delta configuration with respect to the source configuration.

4. The apparatus of claim 3, wherein the at least one memory and the computer program code are configured to, with the at least one processor, further cause the apparatus to enable the sequential execution of the first and second conditional mobility procedures with release of the second configuration based on whether release of the second configuration is acceptable, wherein whether the release of the second configuration is acceptable is dependent on a bearer mapping of the second configuration.

5. The apparatus of claim 1, wherein the at least one memory and the computer program code are configured to, with the at least one processor, further cause the apparatus to enable the sequential execution of the first configuration and the second configuration in dependence on the second configuration containing a same configuration as the source configuration.

6. The apparatus of claim 5, wherein the at least one memory and the computer program code are configured to, with the at least one processor, further cause the apparatus to enable the sequential execution of the first configuration and the second configuration in dependence on the second configuration containing the same configuration as the source configuration and satisfying a user equipment capability split condition.

7. The apparatus of claim 1, wherein the second conditional mobility procedure comprises a plurality of target configurations associated with different target nodes, and not all of the target nodes allow sequential execution of the first and second conditional mobility procedures, and wherein the apparatus the at least one memory and the computer program code are configured to, with the at least one processor, further cause the apparatus to enable the sequential execution of the first and second conditional mobility procedures when allowed by a set 'N' of one or more of the target nodes that are most likely to satisfy a trigger condition of the second conditional mobility procedure.

8. The apparatus of claim 1, wherein the second conditional mobility procedure is a conditional master node handover procedure prompted by a reconfiguration message initiated by the second network node, wherein the second network node is a source master node, wherein the reconfiguration message from the second network node comprises:

a set of one or more target configurations associated with different target master nodes;

a set of one or more handover triggering conditions; and the second configuration comprising a target secondary cell group configuration, wherein the first conditional mobility procedure is a conditional primary secondary cell change procedure prompted by a reconfiguration message initiated by the first network node, wherein the first network node is a secondary node, and wherein the reconfiguration message from the first network node comprises a set of one or more primary secondary cell configurations including the first configuration.

* * * * *